(12) United States Patent
Wang

(10) Patent No.: US 8,936,850 B2
(45) Date of Patent: Jan. 20, 2015

(54) FOAM GLASS HAVING A LOW COEFFICIENT OF THERMAL EXPANSION AND RELATED METHODS

(75) Inventor: Bo Wang, Lompoc, CA (US)

(73) Assignee: Imerys Filtration Minerals, Inc., San Jose, CA (US)

(*) Notice: Subject to any disclaimer, the term of this patent is extended or adjusted under 35 U.S.C. 154(b) by 0 days.

(21) Appl. No.: 13/810,602

(22) PCT Filed: Jul. 14, 2011

(86) PCT No.: PCT/US2011/044001
§ 371 (c)(1),
(2), (4) Date: Jan. 16, 2013

(87) PCT Pub. No.: WO2012/012259
PCT Pub. Date: Jan. 26, 2012

(65) Prior Publication Data
US 2013/0116107 A1    May 9, 2013

Related U.S. Application Data

(60) Provisional application No. 61/365,562, filed on Jul. 19, 2010.

(51) Int. Cl.
*B32B 3/26* (2006.01)
*B32B 3/00* (2006.01)
(Continued)

(52) U.S. Cl.
CPC ............... *C03C 11/007* (2013.01); *C03C 1/00* (2013.01); *C03C 3/091* (2013.01)
USPC .......... 428/312.6; 428/304.4; 501/39; 264/43

(58) Field of Classification Search
CPC .... B32B 5/18; B29K 2105/04; C04B 41/009; C03C 11/007; C03C 11/00; C03B 19/08

USPC ........ 428/304.4, 312.2, 312.6; 501/39; 65/22; 264/41, 42, 43, 44, 51
See application file for complete search history.

(56) References Cited

U.S. PATENT DOCUMENTS 2,431,884 A   12/1947   Neuschotz
2,602,782 A    7/1952   Zoradi
(Continued)

FOREIGN PATENT DOCUMENTS

CN    1 030 565        1/1989
CN    1 076 671 A      9/1993
(Continued)

OTHER PUBLICATIONS

Saakyan, E. R., "Multifunctional Foam Glasses From Volcanic Glassy Rocks", 2302 Glass and Ceramics, vol. 48, No. 1, 1991, pp. 3-5.
(Continued)

*Primary Examiner* — Noah Wiese
(74) *Attorney, Agent, or Firm* — Finnegan, Henderson, Farabow, Garrett & Dunner, L.L.P.

(57) ABSTRACT

Foam glass may include natural glass, wherein the foam glass includes greater than 5% alumina by weight of the foam glass and has a coefficient of thermal expansion ranging between $4\times10^{-6}$ ppm/° C. and $6\times10^{-6}$ ppm/° C. A composition for making foam glass may include natural glass including at least 5% alumina by weight of the composition, soda ash including less than 10% by weight of the composition, and boric acid including at least 5% by weight of the composition. A method for making foam glass may include mixing natural glass with boron to form a mixture, milling the mixture, melting the mixture at a temperature of at least 900° C., and allowing the melted mixture to cool, such that the foam glass includes at least 5% alumina by weight of the foam glass and at least 5% boron oxide by weight of the foam glass.

27 Claims, 2 Drawing Sheets

(51) Int. Cl.
*C03C 11/00* (2006.01)
*B28B 7/04* (2006.01)
*C03C 1/00* (2006.01)
*C03C 3/091* (2006.01)

(56) References Cited

U.S. PATENT DOCUMENTS

| | | |
|---|---|---|
| 2,779,136 A | 1/1957 | Hood et al. |
| 3,150,988 A | 9/1964 | Dess et al. |
| 3,203,813 A | 8/1965 | Gajardo et al. |
| 3,348,994 A | 10/1967 | Rees et al. |
| 3,459,565 A | 8/1969 | Jones et al. |
| 3,592,619 A | 7/1971 | Elmer et al. |
| 3,762,935 A | 10/1973 | Leach |
| 3,793,039 A | 2/1974 | Rostoker |
| 3,874,861 A | 4/1975 | Kurz |
| 3,951,632 A | 4/1976 | Seki et al. |
| 3,986,883 A | 10/1976 | Toth et al. |
| 4,024,309 A | 5/1977 | Pender |
| 4,198,224 A | 4/1980 | Kirkpatrick |
| 4,207,113 A | 6/1980 | Yoshino et al. |
| 4,244,721 A | 1/1981 | Gupta et al. |
| 4,248,810 A | 2/1981 | Erskine |
| 4,430,108 A | 2/1984 | Hojaji et al. |
| 4,432,798 A | 2/1984 | Helferich et al. |
| 4,758,538 A | 7/1988 | Satoh et al. |
| 4,923,332 A | 5/1990 | Sanocki et al. |
| 4,990,398 A | 2/1991 | Fukumoto et al. |
| 5,069,960 A | 12/1991 | Fukumoto et al. |
| 5,195,843 A | 3/1993 | George et al. |
| 5,516,351 A | 5/1996 | Solomon et al. |
| 5,588,977 A | 12/1996 | Pavlov et al. |
| 6,368,527 B1 | 4/2002 | Gontmakher et al. |
| 6,478,993 B2 | 11/2002 | Gontmakher et al. |
| 6,913,643 B2 | 7/2005 | Dejaiffe |
| 6,964,809 B2 | 11/2005 | Hojaji et al. |
| 7,354,542 B1 | 4/2008 | Girgin |
| 7,459,208 B2 | 12/2008 | Wang |
| 2004/0162210 A1 | 8/2004 | Dejaiffe |
| 2005/0016093 A1 | 1/2005 | Buarque De Macedo |
| 2005/0019542 A1 | 1/2005 | Hojaji et al. |
| 2005/0031844 A1 | 2/2005 | Wang |
| 2009/0220713 A1* | 9/2009 | Wang .................. 428/34.4 |
| 2010/0113244 A1 | 5/2010 | Chi et al. |

FOREIGN PATENT DOCUMENTS

| | | | |
|---|---|---|---|
| DE | 118 972 | 4/1976 | |
| JP | 53-125442 | 11/1978 | |
| JP | 54-8614 A | 1/1979 | |
| JP | 58-88128 | 5/1983 | |
| JP | 58-99128 | 6/1983 | |
| JP | 58-217433 | 12/1983 | |
| JP | 58-217438 | 12/1983 | |
| JP | 61-55128 | 3/1986 | |
| JP | 63-144144 | 6/1988 | |
| JP | 64-52626 | 2/1989 | |
| JP | 64-56333 | 3/1989 | |
| JP | 1-157433 | 6/1989 | |
| JP | 2-59482 | 2/1990 | |
| JP | 02-092842 | 4/1990 | |
| JP | 2001-294436 | 10/2001 | |
| WO | WO/2007/109646 * | 9/2007 | ............. E04B 1/100 |
| WO | WO 2007-109646 A2 | 9/2007 | |
| WO | WO 2012-012259 A1 | 1/2012 | |

OTHER PUBLICATIONS

English Language Abstract of SU 1 089 069, XP-002195963, Stone Silicates Res., Apr. 30, 1984.

International Search Report and Written Opinion issued Dec. 6, 2011, in International PCT Application No. PCT/US2011/044001, filed Jul. 14, 2011.

International Search Report and Written Opinion issued Jan. 23, 2008 for related International PCT Application No. PCT/US2007/064362.

* cited by examiner

FOAM GLASS HAVING A LOW COEFFICIENT OF THERMAL EXPANSION AND RELATED METHODS

CLAIM OF PRIORITY

This application is a U.S. national stage entry under 35 U.S.C. §371 from PCT International Application No. PCT/US2011/044001, filed Jul. 14, 2011, which claims priority to and the benefit of the filing date of U.S. Provisional Application No. 61/365,562, filed Jul. 19, 2010, to both of which this application claims the benefit of priority, and the entirety of the subject matter of both of which is incorporated herein by reference

FIELD OF THE DISCLOSURE

This disclosure relates to foam glass and related methods. In particular, this disclosure relates to foam glass having a low coefficient of thermal expansion and related methods.

BACKGROUND

Glass is an inorganic product of fusion that has cooled to a rigid condition without crystallizing. The most common glasses are silicate glasses. The basic structural unit of silicate glasses has a silicon atom tetrahedrally-coordinated to four surrounding oxygen atoms. Similar to the crystalline silicates, the $SiO_4$ tetrahedra in the silicate glasses may be found in a variety of configurations depending on the oxygen-to-silicon ratio in the glass compositions.

Some glasses are naturally occurring, such as, for example, perlite, pumice, obsidian, pitchstone, volcanic ash, and shirasu. Others, such as soda-lime glasses, may be produced synthetically. For example, soda-lime glass may be made by melting batches of raw materials containing the oxides of silicon (e.g., $SiO_2$), aluminum (e.g., alumina ($Al_2O_3$)), calcium (e.g., CaO), sodium (e.g., $Na_2O$), and sometimes potassium (e.g., $K_2O$) or lithium (e.g., $Li_2O$) in a furnace, and allowing the resulting melt to cool to produce the amorphous product. Glasses may be made in a wide variety of shapes, including sheets or plates, cast shapes, or fibers. Methods of manufacturing the principal families of glasses have been previously reported (e.g., Scholes, Modern Glass Practice, 7th ed. by C. Greene, Boston, Mass., CBI Publishing Company, Inc., 1974). Mineral wools, rock wools, and silicate cottons are generic names for manufactured fibers in which the fiber-forming substances may be slag, certain rocks, or glass (Kujawa, Industrial Minerals and Rocks, 5th ed., Littleton, Colo.: Society for Mining, Metallurgy, and Exploration, Inc., pp. 199-201, 1983).

Foam glasses are a class of lightweight glass materials having numerous sealed small cells. The base glass composition may be similar to typical window glasses, which may typically contain, for example, 70-73% $SiO_2$, 1-3% $Al_2O_3$, 0.1-0.5% $Fe_2O_3$, 13-15% $Na_2O$, 0-2% $K_2O$, 5-7% CaO and 3-5% MgO (by weight).

Several techniques have been used to make foam glasses. For example, by leaching out the borate phase from a borosilicate glass, a silica-rich phase with very fine pores (e.g., 10 to 25 Å) may be obtained (see, e.g., Elmer, U.S. Pat. No. 3,592,619). Moisture trapped in the fine pores by leach solution may cause the fine pores to expand after heating the leached glass at, for example, 1,300° C.-1,425° C., by flash-firing. The foaming and sintering of the porous glass particles may occur generally simultaneously. Alternately, foam glasses may also be made by blowing air or other gases into molten glass and allowing the molten glass to cool and entrap the bubbles or cells in the solidified glass. However, these products have structural characteristics, such as low-compressive strength, low-abrasion resistance, and low-dimensional stability, which may not be desirable in chimney lining and structural applications.

In addition, it may be desirable to provide a ceramic material having thermal stability and low density. For example, it may be desirable to provide foam glass having a low coefficient of thermal expansion. Such foam glass may be desirable for, for example, lining chimneys, ductwork, inlets and outlets of scrubbers and smoke stacks for FGD (flue gas desulfurization) applications. Due to the high thermal expansion coefficient, regular glass tiles are often incapable of rapidly absorbing and evenly distributing heat during rapid temperature changes in the chimney and smoke stacks. The rapid temperature changes can cause the chimney lining tiles to change temperature much more rapidly on the inside than on the outside of the tile, resulting in an unequal expansion, which in turn, causes the flue tiles to crack and split apart.

Accordingly, there may be a desire to provide a more thermally stable foam glass having properties such as a low coefficient of thermal expansion (CTE), a low density, dimensional stability, abrasion and chemical resistance, and/or a high compressive strength.

SUMMARY

In the following description, certain aspects and embodiments will become evident. It should be understood that the aspects and embodiments, in their broadest sense, could be practiced without having one or more features of these aspects and embodiments. Thus, it should be understood that these aspects and embodiments are merely exemplary.

One aspect of the disclosure relates to low CTE foam glass including natural glass, wherein the foam glass comprises greater than 5% alumina by weight of the foam glass and has a coefficient of thermal expansion (CTE) ranging between 2 ppm/° C. and 6 ppm/° C. For example, the foam glass may have a coefficient of thermal expansion ranging between 4.5 ppm/° C. and 5.5 ppm/° C. at 50° C.

According to a further aspect, the natural glass may include perlite. For example, the natural glass may include unexpanded perlite and/or expanded perlite. According to another aspect, the natural glass may be selected from pumice, obsidian, pitchstone, volcanic ash, and shirasu.

According to still a further aspect, the low CTE foam glass may include sodium oxide ($Na_2O$) ranging from 1% to 7% by weight of the foam glass.

In yet another aspect, the low CTE foam glass may include boron oxide ($B_2O_3$) ranging from 5% to 15% by weight of the foam glass.

According to another aspect, the density of the low CTE foam glass may range from 10 lb/ft³ to 50 lb/ft³. For example, the density of the foam glass may range from 10 lb/ft³ to 40 lb/ft³, from 10 lb/ft³ to 30 lb/ft³, from 10 lb/ft³ to 20 lb/ft³, or from 12 lb/ft³ to 15 lb/ft³.

According to still a further aspect, a composition for making low CTE foam glass may include natural glass comprising at least 5% alumina by weight of the composition, an alkali compound (e.g., soda ash) comprising less than 10% by weight of the composition, and a boron compound (e.g. boric acid) comprising at least 5% by weight of the composition. For example, the alkali compound may comprise less than 7% by weight of the composition, such as, for example, less than 5% by weight of the composition, or less than 3% by weight of the composition. In some embodiments, the composition may not include any added alkali compound beyond that naturally present in the natural glass.

According to yet a further aspect, the boron compound may comprise between 8% and 25% by weight of the composition, such as, for example, between 8% and 20% by weight of the composition, between 10% and 20% by weight of the composition, or between 14% and 18% by weight of the composition.

According to still another aspect, the natural glass may include perlite, such as, for example, expanded perlite and/or unexpanded perlite. For example, the composition may include unexpanded perlite having a $d_{10}$ of not greater than 2 microns and a $d_{90}$ of not greater than 10 microns. For example, the composition may include unexpanded perlite having a $d_{50}$ of not greater than 6 microns. For example, the composition may include unexpanded perlite having a $d_{50}$ of not greater than 5 microns. For example, the composition may include unexpanded perlite having a $d_{10}$ of not greater than 1.5 micron, a $d_{90}$ of not greater than 7 microns, and a $d_{50}$ of not greater than 3 microns.

According to yet another aspect, a method for producing foam glass may include mixing natural glass with a boron containing composition to form a mixture, milling the mixture, melting the mixture at a temperature of at least 900° C., and allowing the melted mixture to cool. According to another aspect of the method, the foam glass may comprise at least 5% alumina by weight of the foam glass and at least 5% boron oxide by weight of the foam glass.

According to a further aspect, the method may further include mixing an alkali containing composition (e.g., soda ash) with the mixture, wherein the mixture may comprise from 0% to 10% alkali containing composition by weight of the mixture. According to still a further aspect of the method, the boron containing composition may include boric acid. For example, the mixture may comprise from 5% and 25% boric acid by weight of the mixture. According to another aspect of the method, the natural glass may include unexpanded perlite. For example, the unexpanded perlite may have a $d_{10}$ of not greater than 2 micron, a $d_{90}$ of not greater than 7 microns, and a $d_{50}$ of not greater than 3 microns.

Additional objects and advantages will be set forth in part in the description which follows, and in part may be learned by practice of the disclosed embodiments. The objects and advantages may be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EXEMPLARY EMBODIMENTS

Figure 1:
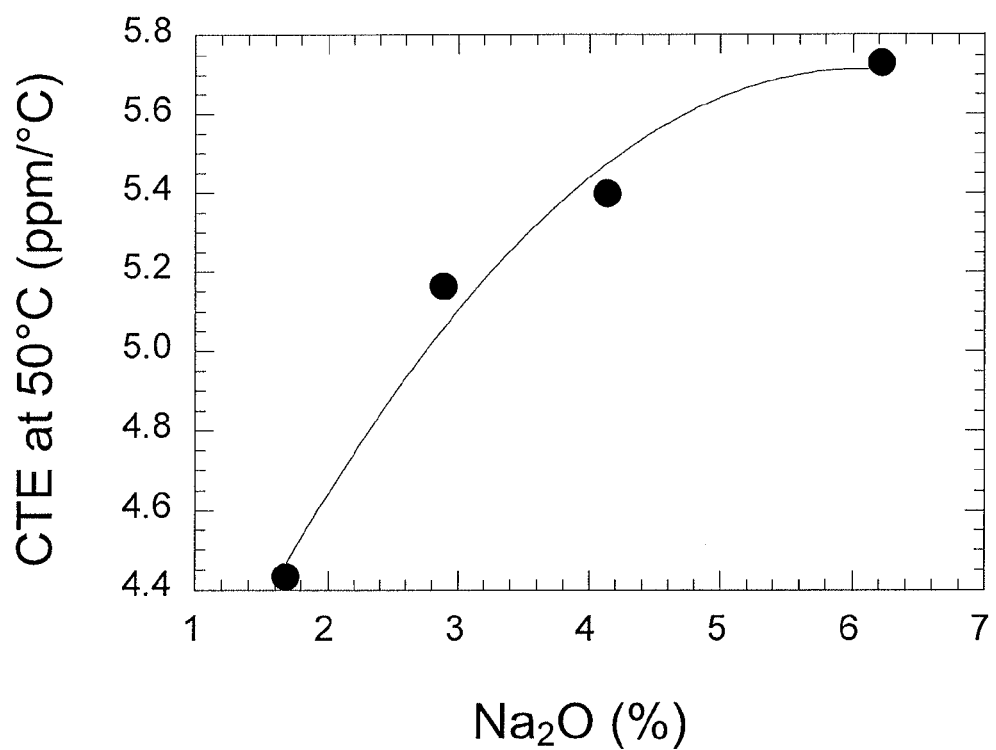
FIG. 1 is a graph of coefficient of thermal expansion (CTE) vs. $Na_2O$ content for an exemplary embodiment of foam glass.

Reference will now be made in detail to exemplary embodiments.

For example, in some embodiments, a foam glass has a coefficient of thermal expansion less than 6 ppm/° C. at 50° C., density ranging from about 10 lb/ft$^3$ to about 50 lb/ft$^3$, and an alumina content of at least about 5% by weight, relative to the total weight of the foam glass. Glass with high alumina content may generally have better chemical resistance.

Coefficient of thermal expansion (CTE) may indicate whether the material can stand the thermal shock. CTE is normally measured using a dilatometer according to the standard ASTM test method C372-94, "Test method for linear thermal expansion of porcelain enamel and glaze frits and fired ceramic whiteware products by the dilatometer method," with heating rate of 3 C.°/min.

Density may indicate the degree to which the foam glass retains a porous structure. For example, density can be determined by dividing the sample weight by the measured volume, and can be reported in units of lb/ft$^3$ or in units of kg/m$^3$.

In some embodiments, the foam glass can have a density of less than about 50 lb/ft$^3$. According to some embodiments, the density of the foam glass may range from 8 lb/ft$^3$ to 40 lb/ft$^3$. For example, the density of the foam glass may range from 8 lb/ft$^3$ to 30 lb/ft$^3$, from 10 lb/ft$^3$ to 20 lb/ft$^3$, or from 12 lb/ft$^3$ to 15 lb/ft$^3$.

Compressive strength measures the stress at which a material fails under load. Disclosed herein are foam glass compositions with high compressive strength, such as, which may be desirable, for example, when the foam glass is used in construction applications.

The compressive strength of the foam glass may be measured based on a standard method of the American Society of Testing and Materials. (See, e.g., ASTM Designation C165 (Reapproved 2000), Standard Test Method for Measuring Compressive Properties of Thermal Insulations, in which the disclosure for measuring compressive strength is incorporated herein by reference.) For example, a 2.0 inch square specimen having a thickness of 0.5 inch is placed between 8.0 inch square loading surfaces. The specimen is then compressed at a crosshead speed of 0.008 inch/minute continuously until a maximum load is reached. The maximum load may be recorded as the compressive strength, which may be reported in units of psi or kPa.

In some embodiments, the foam glass has a compressive strength of at least about 80 psi, such as, for example, a compressive strength of at least about 100 psi, at least about 150 psi, at least about 200 psi, at least about 250 psi, at least about 300 psi, or at least about 400 psi.

In some embodiments, the low CTE foam glass has an alumina ($Al_2O_3$) content greater than 5% by weight, such as an alumina content ranging from about 5% to about 15% by weight, relative to the total weight of the foam glass, such as, for example, an alumina content ranging from about 6% to about 12% by weight, or an alumina content ranging from about 8% to about 10% by weight.

In some embodiments, the low CTE foam glass has a silica ($SiO_2$) content greater than 40% by weight, such as a silica content ranging from about 40% to about 80% by weight, relative to the total weight of the foam glass, such as a silica content ranging from about 50% to about 75% by weight, relative to the total weight of the foam glass, such as, for example, a silica content ranging from about 65% to about 75% by weight, or a silica content ranging from about 70% to about 80% by weight. In other embodiments, the low CTE foam glass has a silica content greater than 50% by weight, such as greater than 60% by weight or greater than 70% by weight.

In some embodiments, the low CTE foam glass comprises boron oxide in an amount ranging from about 3% to about 15%. According to some embodiments, the low CTE foam glass may have a boron oxide content ranging from 5% to 12% by weight of the foam glass. For example, the boron oxide may be in the form of $B_2O_3$.

According to some embodiments, a composition for forming low CTE foam glass may include boric acid, which may comprise between 8% and 25% by weight of the composition, such as, for example, between 8% and 20% by weight of the composition, between 10% and 20% by weight of the composition, or between 14% and 18% by weight of the composition.

In some embodiments, the low CTE foam glass comprises silica in an amount ranging from, for example, about 65% to about 75% by weight, relative to the total weight of the foam glass.

In some embodiments, the low CTE foam glass is porous. For example, the low CTE foam glass may have an average pore size ranging from about 0.5 mm to about 3 mm, such as, for example, an average pore size ranging from about 0.1 mm to about 2 mm, or an average pore size ranging from about 0.2 mm to about 1 mm.

In some embodiments, the low CT foam glass comprises a closed-cell porous structure. The closed cell structure may be generally impermeable to liquids and gases.

In some embodiments, the low CTE foam glass further comprises other materials such as, for example, reinforcing materials and colorants. When used, structural or reinforcing materials may include a metal mesh, such as, for example, high strength nickel containing alloy. An example of a commercially available alloy reinforcing material is Inconel™, which refers to a family of high strength austenitic nickel-chromium-iron alloys that have exceptional anti-corrosion and heat-resistance properties. These commercial alloys contain high levels of nickel and can be thought of as super-stainless steels.

In some embodiments, the reinforcing material is chosen from, for example, carbon fiber, silicon carbide fiber, boron nitride fiber, glass fiber, metal fiber, ceramic fiber, woven fiber, metal honeycomb, ceramic honeycomb, and fibrous minerals, such as, for example, wollastonite.

In some embodiments, the foam glass further comprises at least one colorant. Exemplary colorants include, for example, $Fe_2O_3$, Co(+2) or Co (+3) oxides, such as $Co_3O_4$, and Cu(+1) and Cu(+2) compounds, for example, oxides such as CuO, and $Cu_2O$, or sulfates such as $CuSO_4$.

According to some embodiments, methods for preparing low CTE foam glass include: combining a natural glass feed with at least one foaming agent; milling the combined natural glass feed and the at least one foaming agent to form a powdered mixture; melting the powdered mixture to form a molten product; cooling and annealing the molten product to form a foam glass having a CTE less than about 5.5 ppm/° C., density of less than about 20 lb/ft$^3$ and a compressive strength of at least about 100 psi.

In some embodiments, the natural glass feed may include any perlite, such as unexpanded or expanded perlite ore. Perlite ore is a hydrated natural glass containing typically about 72-75% $SiO_2$, 12-14% $Al_2O_3$, 0.5-2% $Fe_2O_3$, 3-5% $Na_2O$, 4-5% $K_2O$, 0.4-1.5% CaO (by weight), and small concentrations of other metallic elements. Perlite may also contain small amounts of chlorine, $TiO_2$, and MnO. Perlite ore may be distinguished from other natural glasses by a higher content (2-10% by weight) of chemically bonded water, the presence of a vitreous, pearly luster, and characteristic concentric or arcuate onion skin-like (perlitic) fractures. Expanded perlite includes one or more cells, or parts of cells, in which a cell is a void space partially or entirely surrounded by walls of glass, usually formed from expansion of gases when the glass is in a softened state.

In some embodiments, the feed for the low CTE foam glass may include other natural glasses, such as, for example, those commonly referred to as "volcanic glasses." Natural glasses are typically formed by the rapid cooling of siliceous magma or lava. In some embodiments, the natural glass may be fine perlite ore or expanded fine perlite. In some embodiments, the foam glass is derived from natural glasses chemically equivalent to rhyolite. Other natural glasses include those that are, for example, chemically equivalent to trachyte, dacite, andesite, latite, basalt, and obsidian, which generally refers to dark (often black), massive natural glasses that are rich in silica ($SiO_2$). Obsidian glasses may be classified into subcategories according to their silica content. For example, rhyolitic obsidians typically contain about 73% $SiO_2$ by weight (Berry, L. G. et al. Mineralogy 2$^{nd}$ Ed., N.Y.: Freeman and Co., pp. 540-542, 1983).

In some embodiments, the natural glass feed may be supplemented with other minerals, such as, for example, diatomaceous earth (natural, calcined, and flux calcined), fly ash, vitrifiable minerals such as liparite, rhyolite, pearlite, obsidian, and volcanic ash. In some embodiments, the natural glass feed may be supplemented with other glasses, such as, for example, recycled cullet glass.

In some embodiments, the natural glass feed may have a selected particle size distribution. For example, in some embodiments, a natural glass feed with finer particle size may be desired. In some embodiments, the natural glass feed may include a fine perlite ore, such as the fine fraction of a classified perlite.

In some embodiments, the particle size distribution of the natural glass feed may be determined by scattered light from a laser beam projected through a stream of particles. The amount and direction of light scattered by the particles can be measured by an optical detector array and then analyzed by a microcomputer that calculates the size distribution of the particles in the sample stream. Data reported may be collected on a Leeds and Northrup Microtrac X100 laser particle size analyzer (Leeds and Northrup, North Wales, Pa.). This instrument can determine particle size distribution over a particle size range from 0.12 to 704 microns. Bottom particle size ($d_{10}$) and top particle size ($d_{90}$) are defined as that size for which 10% or 90% of the volume that is smaller than the indicated size, respectively.

In some embodiments, the natural glass feed has a median particle size ($d_{50}$) less than about 50 μm, such as, for example, a median particle size ($d_{50}$) less than about 20 μm, less than about 10 μm, less than about 5 μm, or less than about 3 μm.

In some embodiments, the natural glass feed is chosen from unexpanded fine perlite ore and expanded fine perlite. In some embodiments, prior to combining a natural glass feed with at least one foaming agent, the natural glass feed comprises perlite that has been processed and expanded at high temperature to make expanded perlite. The processing of perlite may include comminution of the ore (e.g., crushing and grinding), screening, thermal expansion, and air size separation of the expanded material. For example, perlite ore may be crushed, ground, and separated to a predetermined particle size range (e.g., passing 30 mesh), and thereafter the separated material may be heated in air at a temperature of 870-1,100° C. in an expansion furnace (see, e.g., U.S. Pat. Nos. 2,431,884 and 2,602,782, in which the disclosures of heating in an expansion furnace are incorporated herein by reference), where the simultaneous softening of the glass and vaporization of contained water leads to rapid expansion of glass particles to form a frothy glass material with a bulk volume up to, for example, twenty times that of the unexpanded ore. The expanded perlite may thereafter be separated to meet the desired size specification of the final product.

The at least one foaming agent may release gas or vapor at the foaming temperature during the glass melting to form the sealed cell structure. In some embodiments, the at least one foaming agent may be chosen from organic carbonates, metal carbonates, metal sulfates, and carbon black or graphite. Exemplary metal carbonates include alkali metal and alkaline earth metal carbonates, such as, for example, $Na_2CO_3$, $K_2CO_3$, $CaCO_3$, and $MgCO_3$. Exemplary metal sulfates include alkali and alkaline earth metal sulfates.

According to some embodiments, milling the combined natural glass feed and the at least one foaming agent to form a powdered mixture may be performed by any method known in the art, such as, for example, by using a steel mill, ball mill, hammer mill, and/or similar type crusher, such as, for example, a stirred media mill and pin mill.

In some embodiments, melting the powdered mixture to form a molten product may be performed at a temperature ranging from about 900° C. to about 1,100° C., such as, for example, a temperature ranging from about 950° C. to about 1,050° C. In some embodiments, the melting is performed at 1,000° C. In some embodiments, the melting is performed at a temperature ranging from about 975° C. to about 1,000° C., from about 1,000° C. to about 1,025° C., from about 1,025° C. to about 1,050° C., or from about 1,050° F. to about 1,075° C.

In some embodiments, cooling and annealing the molten product to form a foam glass may be performed by allowing the melted mixture from to cool to about room temperature.

In one embodiment, the foam glass may have a density of less than about 30 lb/ft$^3$. For example, the density may range from about 8 lb/ft$^3$ to about 10 lb/ft$^3$, from about 10 lb/ft$^3$ to about 12 lb/ft$^3$, from about 12 lb/ft$^3$ to about 14 lb/ft$^3$, from about 14 lb/ft$^3$ to about 16 lb/ft$^3$, from about 16 lb/ft$^3$ to about 18 lb/ft$^3$, or from about 18 lb/ft$^3$ to about 20 lb/ft$^3$ In some embodiments, the low CTE foam glass may be prepared by optionally mixing natural glass feed with appropriate amounts of soda ash, calcium carbonate, boric acid, and carbon black. Exemplary compositions may include, for example, soda ash from 0% to 10%, calcium carbonate from 5% to 10%, boric acid from 5% to 20%, and carbon black from 0% to 1%. After fine milling in, for example, a steel mill, a ball mill or a stirred media mill, the mixture may be placed in a heat resistant metal or alloy container coated with high melting powders, such as aluminum oxide as a releasing agent. Such containers may be, for example, nickel crucibles, ceramic molds, or high temperature-resistant alloy molds formed of, for example, Inconel™. The low CTE foam glass may be formed by melting the mixture at a temperature ranging from, for example, 900° C. to 1,100° C., for 1 minute to 30 minutes or more, as desired, in an electric furnace, a gas furnace, or a tunnel furnace. Following melting, the mixture may be annealed by allowing it to cool to room temperature. The annealing process may be achieved by furnace cooling the sample from to about room temperature.

According to some embodiments, glass network formers, such as, for example, boron, and additional glass network modifiers, such as, for example, sodium and calcium, may be used in the process of making the foam glass. Accordingly, in some embodiments, combining a natural glass feed with at least one foaming agent includes combining the natural glass feed with at least one foaming agent, at least one glass network former, and/or at least one glass network modifier.

The low CTE foam glass disclosed herein may be used in applications, such as, for example, lining chimneys, ductwork, inlets and outlets of scrubbers, and smoke stacks for FGD (flue gas desulfurization) applications, light-weight construction products, thermal and acoustic insulating products, or other applications where conventional foam glasses are used. Exemplary applications include linings for chimneys, linings for smoke stacks, roof tile, cladding, wallboard, floating dock, water meter box, and above-ground pipe.

According to some embodiments, a lining tile comprises foam glass as disclosed herein. In some embodiments, foam glass used for the lining tile applications may comprise a coefficient of thermal expansion (CTE) ranging between 4 ppm/° C. and 6 ppm/° C.

According to some embodiments, a brick comprises foam glass as disclosed herein. For example, foam glass used for brick applications may comprise a porous material having an average pore size ranging from, for example, about 0.5 mm to about 3 mm.

In some embodiments, foam glass used for lining tile applications may have a density ranging from about 8 lb/ft$^3$ to about 50 lb/ft$^3$.

In some embodiments, products comprising foam glass as disclosed herein may comprise a flat hard glaze surface, such as, for example, a hard glaze surface on at least one face. This hard glaze is formed naturally during the glass melting process by controlling the glass composition (e.g., to remove carbon black from the composition), heating rate (e.g., at 5° C./min.), and residence time (e.g., to extend residence time from 30 to 60 min.). At these exemplary conditions, a thick hard flat glass glaze can be formed on the surface foam glass with the closed cell structure underneath the hard glaze. Unlike regular glazed tiles, no additional post firing/melting process is needed to form the glaze. For example, a natural flat hard glaze on the surface of the finish products formed during the firing process can be used for lining tile applications.

EXAMPLES

Examples 1-5

According to some embodiments, the coefficient of thermal expansion (CTE) of foam glass may be reduced by decreasing the alkali and/or sodium content of the foam glass (e.g., by decreasing the soda ash ($Na_2CO_3$) content of the formulation and/or the $Na_2O$ of the resulting foam glass). According to some embodiments, the CTE of foam glass may be reduced by increasing the boron content of the foam glass (e.g., by increasing the boric acid ($H_3BO_3$) of the formulation and/or the boron oxide ($B_2O_3$) content of the resulting foam glass). According to some embodiments, the CTE of foam glass may be reduced by decreasing the alkali and/or sodium content and increasing the boron content of the foam glass.

For example, a commercially-available unexpanded, fine perlite ore, Harborlite® MB grade (World Minerals), was used as the feed material for the five samples shown in Table I below. The feed material had a particle size distribution (psd) ranging from 1 μm ($d_{10}$) to 7 μm ($d_{90}$) and an average a particle size ($d_{50}$) of 3 μm. The exemplary feed material was mixed with soda ash ($Na_2CO_3$), calcium carbonate ($CaCO_3$), boric acid ($H_3BO_3$), and carbon black (C) according to the five sample formulations listed in Table I.

TABLE I

Sample Formulations

| Example | Perlite (%) | Na$_2$CO$_3$ (%) | CaCO$_3$ (%) | H$_3$BO$_3$ (%) | C (%) | Total (%) | Batch (g) | Temp (°C.) | Time (min) | Density (lb/ft$^3$) |
|---|---|---|---|---|---|---|---|---|---|---|
| 1 | 74.4 | 8.9 | 7.4 | 8.9 | 0.2 | 100.0 | 60 | 1000 | 30 | 12.1 |
| 2 | 78.0 | 5.0 | 8.0 | 8.7 | 0.3 | 100.0 | 60 | 1025 | 30 | 13.2 |
| 3 | 80.0 | 3.0 | 8.0 | 8.7 | 0.3 | 100.0 | 60 | 1050 | 30 | 13.8 |
| 4 | 82.7 | 0.0 | 8.0 | 9.0 | 0.3 | 100.0 | 60 | 1050 | 30 | 15.1 |
| 5 | 74.7 | 0.0 | 8.0 | 17.0 | 0.3 | 100.0 | 60 | 1050 | 30 | 12.9 |

Each of the five mixtures was then milled in a ceramic ball mill for 120 minutes. For each of the five mixtures, 60 g of the milled mixture was placed in a 3 inch diameter nickel crucible coated with aluminum oxide to serve as a releasing agent. Each of the five milled mixtures was formed into five foam glass samples by melting the mixtures at 1,000° C. to 1,050° C. for 30 minutes in an electric furnace and thereafter annealed by allowing to the melted mixtures cool to room temperature. The five samples of the exemplary foam glass had a pore size distribution ranging from 0.5 mm to 2 mm in diameter, depending on the formulation. All foam glass samples produced were closed cell in form.

In order to measure the boron content (i.e., the B$_2$O$_3$ content) of each of the foam glass samples were ground in zirconia to form powder, and each of the resulting powders was fused in sodium carbonate in platinum crucibles at 1,000° C. The fused powders were cooled to room temperature and dissolved with nitric acid to form solutions. The solutions were transferred to Nalgene volumetric flasks, diluted with deionized water, and analyzed by ICP-OES. Results are given in units of percent by weight of the original sample. Table II below shows the CTE at 50° C. (ppm/° C.), Na$_2$O content, and B$_2$O$_3$ content of each of the five samples.

TABLE II

CTE as a Function of Na$_2$O and B$_2$O$_3$

| Example | CTE at 50° C. (×10$^{-6}$ ppm/° C.) | Na$_2$CO$_3$ (%) | Na$_2$O (%) | H$_3$BO$_3$ (%) | B$_2$O$_3$ (%) |
|---|---|---|---|---|---|
| Example 1 | 5.7281 | 8.9 | 6.23 | 8.9 | |
| Example 2 | 5.3952 | 5.0 | 4.14 | 8.7 | |
| Example 3 | 5.1617 | 3.0 | 2.89 | 8.7 | |
| Example 4 | 4.4311 | | 1.69 | 9.0 | 5.8 |
| Example 5 | 4.0306 | | 1.43 | 17.0 | 11.6 |

The CTE for each sample was measured according to ASTM C372-94, "Test method for linear thermal expansion of porcelain enamel and glaze frits and fired ceramic whiteware products by the dilatometer method" with a heating rate of 3° C./min. Table III below shows the CTE of each sample as a function of temperature ranging from 50° C. to 350° C.

TABLE III

Sample CTE as a Function Temperature

| Temperature (° C.) | Example 1 CTE (×10$^{-6}$ ppm/° C.) | Example 2 CTE (×10$^{-6}$ ppm/° C.) | Example 3 CTE (×10$^{-6}$ ppm/° C.) | Example 4 CTE (×10$^{-6}$ ppm/° C.) | Example 5 CTE (×10$^{-6}$ ppm/° C.) |
|---|---|---|---|---|---|
| 50 | 5.7281 | 5.3952 | 5.1617 | 4.4311 | 4.0306 |
| 100 | 6.7509 | 6.0773 | 5.7700 | 4.5927 | 4.5988 |
| 150 | 6.9466 | 6.2395 | 5.8340 | 4.7292 | 4.7301 |
| 200 | 7.1085 | 6.3439 | 5.9172 | 4.8356 | 4.8062 |
| 250 | 7.2136 | 6.4313 | 5.9930 | 4.9268 | 4.8315 |
| 300 | 7.2911 | 6.5091 | 6.0420 | 5.0112 | 4.8591 |
| 350 | 7.3483 | 6.5334 | 6.0966 | 5.0756 | 4.9015 |

As shown in Table III, the CTE at 50° C. of the foam glass according to the exemplary samples ranges from 4.0 ppm/° C. to 5.8 ppm/° C. As the sodium oxide content (Na$_2$O) of the foam glass decreases from 6.2% to 1.4%, the CTE of the samples decreases from 5.73 ppm/° C. to 4.03 ppm/° C. at 50° C., for example, as shown in FIG. 1. In contrast, as the boron oxide content (B2O3) of the foam glass increases, the CTE of the samples decreases from 5.73 ppm/° C. to 4.03 ppm/° C. at 50° C.

Figure 2:
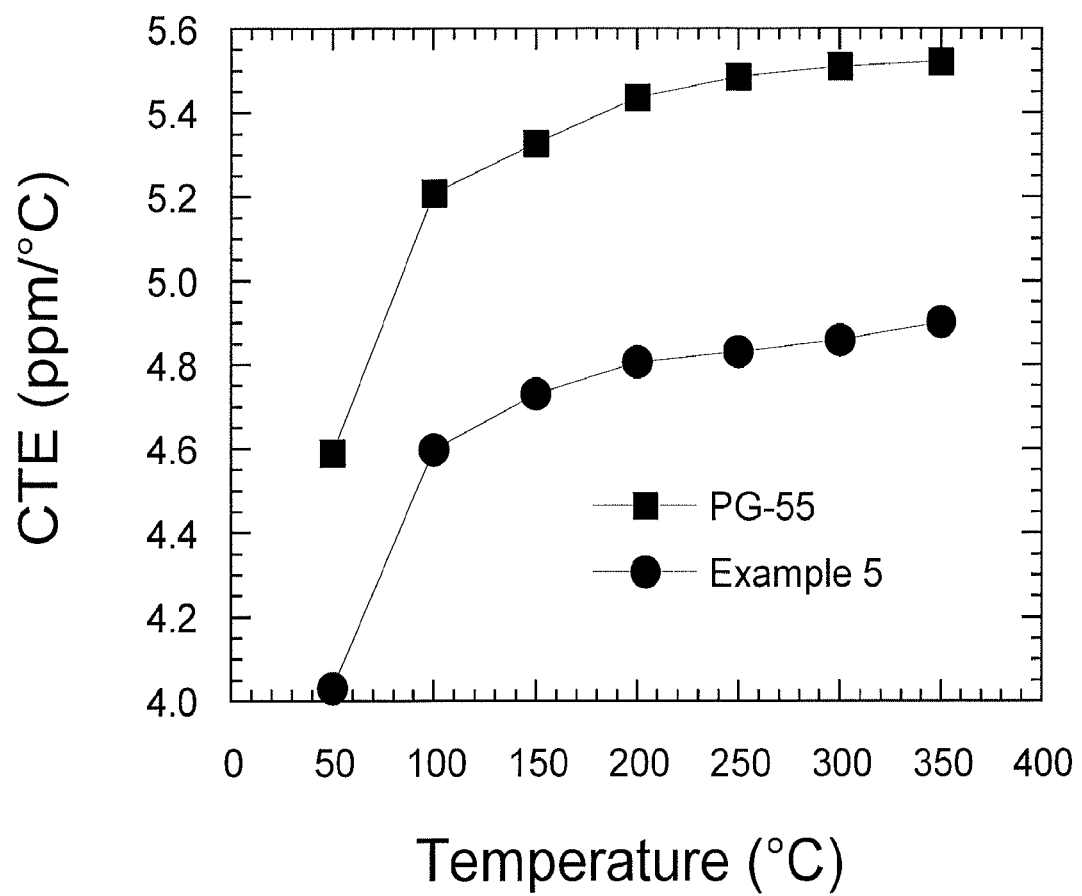
FIG. 2 is a graph of CTE vs. temperature for an exemplary embodiment of foam glass.

As shown in Table III, the tested samples show a relatively stable CTE across a temperature range of 300° C. For example, as shown in Table III and FIG. 2, sample 5 has a CTE ranging from 4.0306 ppm/° C. to 4.9015 ppm/° C., as the temperature increases from 50° C. to 350° C.

Compared to the commercial foam glass blocks Pennguard 55 ("PG-55" in Table III) from Henkel (headquartered in Düsseldorf, Germany), Examples 4 and 5 have lower CTE.

Example 6

Example 1 was repeated, except that no carbon black was used. The glass formulation contained 74.6% perlite, 9.0% Na$_2$O, 7.4% CaCO$_3$, and 9.0% B$_2$O$_3$. The foam glass thus obtained had a flat hard natural neutral color glaze on its top surface. The foam glass had a pore size distribution from 0.1 mm to 1 mm in diameter, a density of 40.0 lb/ft$^3$ (926 kg/m$^3$), and a coefficient of thermal expansion of 5.457 ppm/° C. to 7.3296 ppm/° C. between 50° C. to 350° C. The hard glazed surface is more resistant to abrasion and chemicals such as acids and bases and has higher strength, and improves performance of smoke stack, ductwork, inlets and outlets of scrubbers lining tiles for the FGD applications.

Foam glass having a low and/or relatively stable CTE, such as the exemplary embodiments of Examples 1-6, may be particularly desirable in applications, such as, for example, high temperature applications for lightweight ceramics. For example, such foam glass may be useful for lining chimneys and smoke stacks, ductwork, inlets and outlets of scrubbers.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

Other embodiments of the invention will be apparent to those skilled in the art from consideration of the specification and practice of the exemplary embodiments disclosed herein. It is intended that the specification and examples be considered as exemplary only, with a true scope and spirit of the invention being indicated by the following claims.

What is claimed is:

1. Foam glass comprising natural glass, wherein the foam glass comprises greater than 5% alumina by weight of the foam glass and has a coefficient of thermal expansion ranging between 4 ppm/° C. and 6 ppm/° C., and wherein the density of the foam glass ranges from 12 lb/ft$^3$ to 15 lb/ft$^3$.

2. The foam glass of claim 1, wherein the coefficient of thermal expansion ranges between 4.5 ppm/° C. and 5.5 ppm/° C. at 50° C.

3. The foam glass of claim 1, wherein the foam glass has a natural flat hard glaze on at least one surface.

4. The foam glass of claim 1, wherein the natural glass comprises perlite.

5. The foam glass of claim 1, wherein the natural glass comprises unexpanded perlite.

6. The foam glass of claim 1, wherein the natural glass comprises expanded perlite.

7. The foam glass of claim 1, wherein the natural glass is selected from pumice, obsidian, pitchstone, volcanic ash, and shirasu.

8. The foam glass of claim 1, wherein the foam glass comprises sodium oxide ranging from 1% to 10% by weight of the foam glass.

9. The foam glass of claim 1, wherein the foam glass has a substantially closed cell structure.

10. The foam glass of claim 1, wherein the foam glass comprises boron oxide ranging from 5% to 15% by weight of the foam glass.

11. The foam glass of claim 10, wherein the boron oxide comprises $B_2O_3$.

12. A composition for making foam glass, the composition comprising:
    natural glass comprising at least 5% alumina by weight of the composition;
    soda ash comprising less than 10% by weight of the composition; and
    boric acid comprising at least 5% by weight of the composition,
    wherein the natural glass comprises unexpanded perlite, and
    wherein the unexpanded perlite has a $d_{10}$ of not greater than 2 microns and a $d_{90}$ of not greater than 10 microns.

13. The composition of claim 12, wherein the soda ash comprises less than 7% by weight of the composition.

14. The composition of claim 12, wherein the soda ash comprises less than 5% by weight of the composition.

15. The composition of claim 12, wherein the soda ash comprises less than 3% by weight of the composition.

16. The composition of claim 12, wherein the composition does not comprise soda ash.

17. The composition of claim 12, wherein the boric acid comprises between 8% and 25% by weight of the composition.

18. The composition of claim 12, wherein the boric acid comprises between 8% and 20% by weight of the composition.

19. The composition of claim 12, wherein the boric acid comprises between 10% and 20% by weight of the composition.

20. The composition of claim 12, wherein the boric acid comprises between 14% and 18% by weight of the composition.

21. The composition of claim 12, wherein the natural glass comprises expanded perlite.

22. The composition of claim 12, wherein the unexpanded perlite has a $d_{50}$ of not greater than 6 microns.

23. The composition of claim 22, wherein the unexpanded perlite has a $d_{10}$ of not greater than 1 micron, a $d_{90}$ of not greater than 7 microns, and a $d_{50}$ of not greater than 3 microns.

24. A method for making foam glass, the method comprising:
    mixing natural glass with a boron containing composition to form a mixture;
    milling the mixture;
    melting and foaming the mixture at a temperature of at least 900° C.; and
    allowing the melted mixture to cool,
    wherein the foam glass comprises at least 5% alumina by weight of the foam glass and at least 5% boron containing composition by weight of the foam glass,
    wherein the natural glass comprises unexpanded perlite, and
    wherein the unexpanded perlite has a $d_{10}$ of not greater than 1 micron, a $d_{90}$ of not greater than 7 microns, and a $d_{50}$ of not greater than 3 microns.

25. The method of claim 24, further comprising mixing soda ash with the mixture, wherein the soda ash ranges from 0.0% to 10% by weight of the mixture.

26. The method of claim 25, wherein the boron containing composition comprises boric acid.

27. The method of claim 26, wherein the boric acid comprises between 5% and 25% by weight of the mixture.

* * * * *

UNITED STATES PATENT AND TRADEMARK OFFICE
CERTIFICATE OF CORRECTION

PATENT NO. : 8,936,850 B2  
APPLICATION NO. : 13/810602  
DATED : January 20, 2015  
INVENTOR(S) : Bo Wang It is certified that error appears in the above-identified patent and that said Letters Patent is hereby corrected as shown below:

Title Page, item 57, line 4, "$4\times10^{-6}$ ppm/°C." should read -- 4 ppm/°C. --.

Title Page, item 57, line 4, "$6\times10^{-6}$ ppm/°C." should read -- 6 ppm/°C. --.

Signed and Sealed this  
Nineteenth Day of May, 2015

Michelle K. Lee  
*Director of the United States Patent and Trademark Office*